(12) United States Patent
Kitayama et al.

(10) Patent No.: US 10,138,954 B2
(45) Date of Patent: Nov. 27, 2018

(54) ROTATION TRANSMISSION DEVICE (71) Applicant: NTN CORPORATION, Osaka (JP)

(72) Inventors: Naotsugu Kitayama, Shizuoka (JP);
Kyohei Sasanuma, Shizuoka (JP);
Shintaro Ishikawa, Shizuoka (JP);
Takahide Saito, Shizuoka (JP)

(73) Assignee: NTN CORPORATION, Osaka (JP)

( * ) Notice: Subject to any disclaimer, the term of this patent is extended or adjusted under 35 U.S.C. 154(b) by 43 days.

(21) Appl. No.: 15/125,688

(22) PCT Filed: Mar. 23, 2015

(86) PCT No.: PCT/JP2015/058705
§ 371 (c)(1),
(2) Date: Sep. 13, 2016

(87) PCT Pub. No.: WO2015/146898
PCT Pub. Date: Oct. 1, 2015

(65) Prior Publication Data
US 2017/0002876 A1 Jan. 5, 2017

(30) Foreign Application Priority Data
Mar. 27, 2014 (JP) .................................. 2014-065105

(51) Int. Cl.
*F16D 41/08* (2006.01)
*F16D 41/066* (2006.01)
(Continued)

(52) U.S. Cl.
CPC ........... *F16D 41/088* (2013.01); *F16D 27/10* (2013.01); *F16D 27/112* (2013.01); *F16D 41/066* (2013.01); *F16D 2023/123* (2013.01)

(58) Field of Classification Search
None
See application file for complete search history.

(56) References Cited

U.S. PATENT DOCUMENTS

| 6,257,386 | B1 * | 7/2001 | Saito | ..................... F16D 27/10 |
|---|---|---|---|---|
| | | | | 192/37 |
| 2002/0134634 | A1 * | 9/2002 | Ito | .......................... B60K 6/387 |
| | | | | 192/35 |

(Continued)

FOREIGN PATENT DOCUMENTS

| CN | 103328845 | 9/2013 |
|---|---|---|
| DE | 100 08 278 | 9/2000 |

(Continued)

OTHER PUBLICATIONS

Extended European Search Report dated Mar. 14, 2017 in corresponding European Application No. 15769615.4.

(Continued)

*Primary Examiner* — Jacob S. Scott
*Assistant Examiner* — Timothy Hannon
(74) *Attorney, Agent, or Firm* — Wenderoth, Lind & Ponack, L.L.P.

(57) ABSTRACT

A rotation transmission device includes an inner ring provided on an input shaft, an outer ring provided on an output shaft, rollers mounted between the inner periphery of the outer ring and the outer periphery of the inner ring, an electromagnet as a driving source for moving a roller retainer mounted at the end portion of the housing on the side of the input shaft, a first bearing mounted between the electromagnet and the input shaft, a second bearing mounted between the end portion of the housing on a side of the output shaft and the output shaft, and a third bearing mounted between the inner ring and the outer ring. The rotation transmission device further includes a fourth bearing configured to prevent inclination of the axes of the input shaft and the output shaft relative to each other.

2 Claims, 9 Drawing Sheets

(51) Int. Cl.
    *F16D 27/10*     (2006.01)
    *F16D 27/112*     (2006.01)
    *F16D 23/12*     (2006.01)

(56) References Cited

U.S. PATENT DOCUMENTS

| | | | |
|---|---|---|---|
| 2007/0170029 A1* | 7/2007 | Okada | F16D 27/112 |
| | | | 192/35 |
| 2009/0229945 A1 | 9/2009 | Sato | |
| 2010/0314212 A1 | 12/2010 | Akiyoshi et al. | |
| 2013/0299298 A1 | 11/2013 | Akiyoshi et al. | |
| 2014/0162826 A1* | 6/2014 | Sato | H02K 7/116 |
| | | | 475/168 |

FOREIGN PATENT DOCUMENTS

| | | |
|---|---|---|
| EP | 1 577 193 | 9/2005 |
| JP | 5-312222 | 11/1993 |
| JP | 2008-39133 | 2/2008 |
| JP | 2008-89163 | 4/2008 |
| JP | 2008-95734 | 4/2008 |
| JP | 2009-216213 | 9/2009 |
| JP | 2013-79699 | 5/2013 |
| JP | 2014-9721 | 1/2014 |

OTHER PUBLICATIONS

English translation of International Preliminary Report on Patentability dated Sep. 26, 2016 in International (PCT) Application No. PCT/JP2015/058705.

\* cited by examiner

ROTATION TRANSMISSION DEVICE

TECHNICAL FIELD

This invention relates to a rotation transmission device used to selectively allow and prohibit transmission.

BACKGROUND ART

JP Patent Publication 2014-9721A discloses one of the known rotation transmission devices used to selectively allow and prohibit transmission of rotation from an input shaft to an output shaft.

The rotation transmission device disclosed in JP Patent Publication 2014-9721A includes a tubular housing of which both ends are open; an input shaft having one end thereof received in the housing; an output shaft arranged coaxially with the input shaft; an inner ring provided at the portion of the input shaft received in the housing; an outer ring provided at the portion of the output shaft received in the housing and surrounding the inner ring; pairs of rollers, each pair being received between a cylindrical surface on the inner periphery of the outer ring and one of cam surfaces on the outer periphery of the inner ring; and a roller retainer retaining the pairs of rollers.

The roller retainer comprises two split retainer portions supported so as to be rotatable relative to each other. The two split retainer portions are movable between an engaged position where the pairs of rollers are engaged between the cylindrical surface on the inner periphery of the outer ring and the respective cam surfaces on the outer periphery of the inner ring, and a disengaged position where the pairs of rollers are disengaged from the cylindrical surface and the cam surfaces.

The rotation transmission device further includes an electromagnet as a driving source for moving the two split retainer portions. The electromagnet is mounted at the end portion of the housing of the rotation transmission device on the side of the input shaft.

This rotation transmission device further includes, as bearings for rotatably supporting the input shaft and the output shaft, a first bearing mounted between the electromagnet and the input shaft, a second bearing mounted between the end portion of the housing on the side of the output shaft and the output shaft, and a third bearing mounted between the inner ring and the outer ring. The first bearing, the second bearing, and the third bearing are all single-row deep groove ball bearings.

This rotation transmission device is used, for example, in a steer-by-wire type vehicle steering assembly. A steer-by-wire type vehicle steering assembly converts the steering angle of the steering wheel when the steering wheel is operated by a driver to an electrical signal, and steers right and left wheels based on the electrical signal. The rotation transmission device is mounted in the rotation transmission path of this steer-by-wire type vehicle steering assembly between the steering wheel and a steering actuator configured to change the steering angle of the right and left wheels. The rotation transmission device has a function as a backup clutch which, during the normal state, prohibits transmission of rotation between the steering wheel and the steering actuator, and which, in an abnormal state, such as if power is lost, allows transmission of rotation between the steering wheel and the steering actuator.

In mounting the above-described rotation transmission device, the input shaft is connected to a shaft on the side of the steering wheel by a shaft coupling. The output shaft is connected to a shaft on the side of the steering actuator by a shaft coupling, and a flange provided on the outer periphery of the housing is fixed to a portion of the vehicle body (such as a partition wall between the dashboard and the engine room) by, e.g., bolts. Thus, when using the above-described rotation transmission device, it is necessary to design the vehicle body such that the flange on the outer periphery of the housing can be fixed to a portion of the vehicle body.

The inventors of the present invention considered the possibility of omitting the flange on the outer periphery of the housing. In particular, they considered the possibility of supporting the rotation transmission device only by connecting the input shaft and the output shaft to the shaft on the side of the steering wheel and to the shaft on the side of the steering actuator, respectively, while not fixing the housing by the flange as in the conventional arrangement. If it is possible not to fix the housing by the flange, it will be possible to simply replace conventional shafts of a steering device to which no rotation transmission device is connected, with shafts to which the rotation transmission device having no flange is connected. This improves freedom of design.

However, if the housing is not fixed in position by the flange, it was discovered that the following problem arises.

In particular, if the housing is not fixed in position by the flange, the rotation transmission device is supported by the shaft connected to the input shaft on the side of the steering wheel, and the shaft connected to the output shaft on the side of the steering actuator. In this state, since the input shaft and the output shaft are supported at only three locations, i.e., by the first bearing mounted between the electromagnet and the input shaft, the second bearing mounted between the end portion of the housing on the side of the output shaft and the output shaft, and the third bearing mounted between the inner ring and the outer ring, the axes of the input shaft and the output shaft tend to be inclined relative to each other (that is, misalignment tends to occur therebetween). If the axes of the input shaft and the output shaft are inclined relative to each other, the relative position between the inner ring provided on the input shaft and the outer ring provided on the output shaft changes, thus destabilizing the behavior of the rollers mounted between the inner ring and the outer ring (such that the rollers could remain engaged when they are supposed to be disengaged, or could become engaged when they are not supposed to engage).

An object of the present invention is to provide a rotation transmission device of which the housing need not be fixed in position by a flange, and of which the engaging elements between the inner ring and the outer ring are stable in behavior.

SUMMARY OF THE INVENTION

In order to achieve the above object, the present invention provides a rotation transmission comprising:

a tubular housing having two open ends;

an input shaft having one end thereof received in the housing;

an output shaft arranged coaxially with the input shaft, and having one end of the output shaft received in the housing;

an inner ring provided at a portion of the input shaft received in the housing;

an outer ring provided at a portion of the output shaft received in the housing, and surrounding the inner ring;

engaging elements mounted between an inner periphery of the outer ring and an outer periphery of the inner ring;

an engaging element retainer supported so as to be movable between an engaged position where the engaging elements are engaged between the outer ring and the inner ring by the engaging element retainer, and a disengaged position where the engaging elements are disengaged from the outer ring and the inner ring by the engaging element retainer;

a driving source for moving the engaging element retainer, the driving source comprising an electromagnet mounted at an end portion of the housing on the side of the input shaft;

a first bearing mounted between the electromagnet and the input shaft;

a second bearing mounted between an end portion of the housing on the side of the output shaft and the output shaft; and a third bearing mounted between the inner ring and the outer ring.

The rotation transmission device further comprises a fourth bearing configured to prevent inclination of axes of the input shaft and the output shaft relative to each other.

With this arrangement, since the fourth bearing prevents inclination of the axes of the input shaft and the output shaft relative to each other, the relative position between the inner ring on the input shaft and the outer ring on the output shaft is less likely to change. Therefore, the behavior of the engaging elements stabilizes. This makes it unnecessary to fix the housing in position by a flange, which was necessary in conventional arrangements.

The fourth bearing may be provided between the inner ring and the outer ring, in juxtaposition with the third bearing. This prevents inclination of the axes of the inner ring and the outer ring relative to each other. Therefore, even when a load is applied that tends to cause the axes of the input shaft and the output shaft to be inclined relative to each other, the behavior of the engaging elements mounted between the inner ring and the outer ring is kept stable.

The fourth bearing may be provided between the end portion of the housing on the side of the output shaft and the output shaft, in juxtaposition with the second bearing. This prevents inclination of the axes of the housing and the output shaft relative to each other, so that even when a load is applied that tends to cause the axes of the input shaft and the output shaft to be inclined relative to each other, the behavior of the engaging elements mounted between the inner ring and the outer ring is kept stable.

The fourth bearing may be mounted between the inner periphery of the housing and the outer periphery of the outer ring. This prevents inclination of the axes of the housing and the output shaft relative to each other, so that even when a load is applied that tends to cause the axes of the input shaft and the output shaft to be inclined relative to each other, the behavior of the engaging elements mounted between the inner ring and the outer ring is kept stable.

Advantages of the Invention

The fourth bearing of the rotation transmission device according to the present invention prevents inclination of the axes of the input shaft and the output shaft, thereby making it unnecessary to fix the housing in position by a flange, and also stabilizing the behavior of the engaging elements between the inner ring and the outer ring.

DETAILED DESCRIPTION OF THE INVENTION

Figure 1:
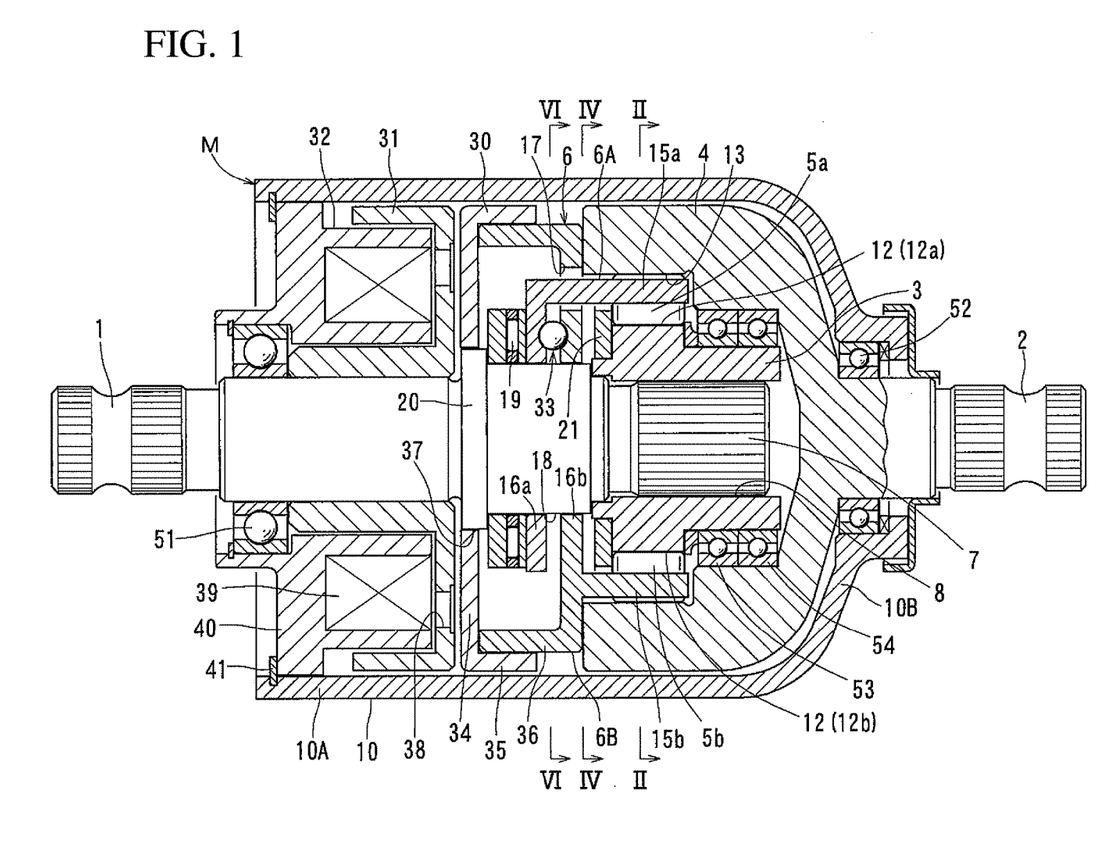
FIG. 1 is a sectional view of a rotation transmission device embodying the present invention.

FIG. 1 shows a rotation transmission device M embodying the present invention. This rotation transmission device M includes a tubular housing 10 having openings at both ends thereof; an input shaft 1 having one end thereof received in the housing 10; an output shaft 2 arranged coaxially with the input shaft 1; an inner ring 3 provided at the portion of the input shaft 1 received in the housing 10; an outer ring 4 provided at the portion of the output shaft 2 received in the housing 10 and surrounding the inner ring 3; a plurality of rollers 5a and 5b mounted between the inner periphery of the outer ring 4 and the outer periphery of the inner ring 3; and a roller retainer 6 retaining the rollers 5a and 5b.

The input shaft 1 includes a serration shaft portion 7 having serrations on the outer periphery thereof and being fitted in a serration hole 8 formed in the center of the inner ring 3. Due to the fitting of the serration shaft portion 7 in the serration hole 8, the input shaft 1 is connected to the inner ring 3 so as to rotate in unison with the inner ring 3. In this embodiment, the input shaft 1 and the inner ring 3 are separate members, but the input shaft 1 and the inner ring 3 may be provided as a seamless integral member.

The output shaft 2 has one end thereof received in the housing 10. The outer ring 4 is integral with the portion of the output shaft 2 received in the housing 10. In this embodiment, the output shaft 2 and the outer ring 4 form a seamless integral (one piece) member, but the output shaft 2 and the outer ring 4 may be separate members that are connected together so as to rotate in unison with each other.

Figure 2:
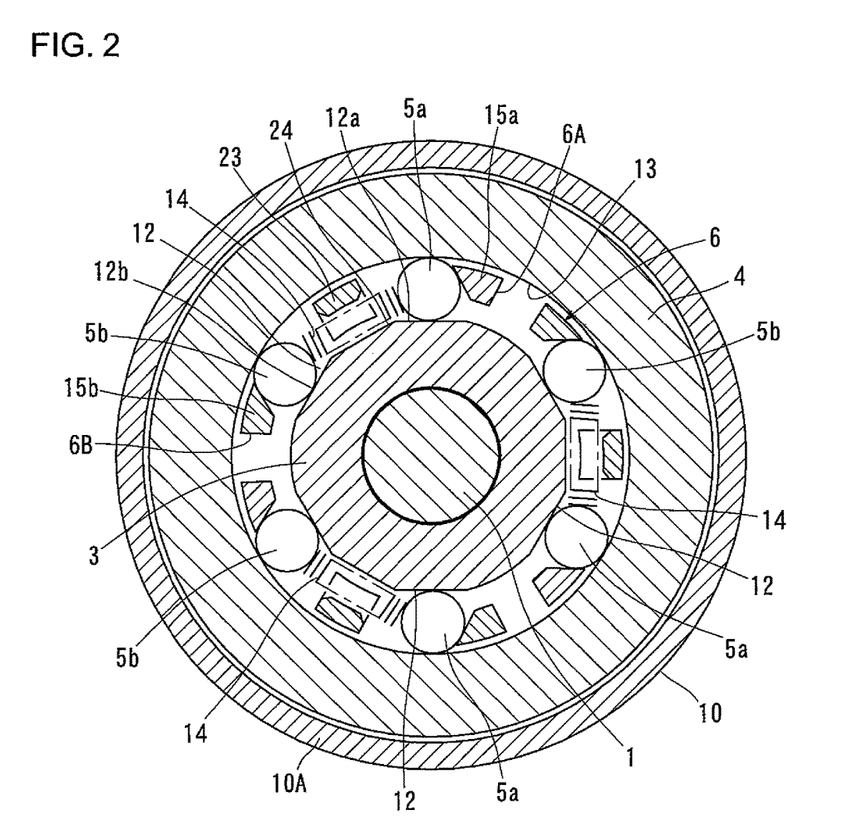
FIG. 2 is a sectional view taken along line II-II of FIG. 1.
Figure 3:
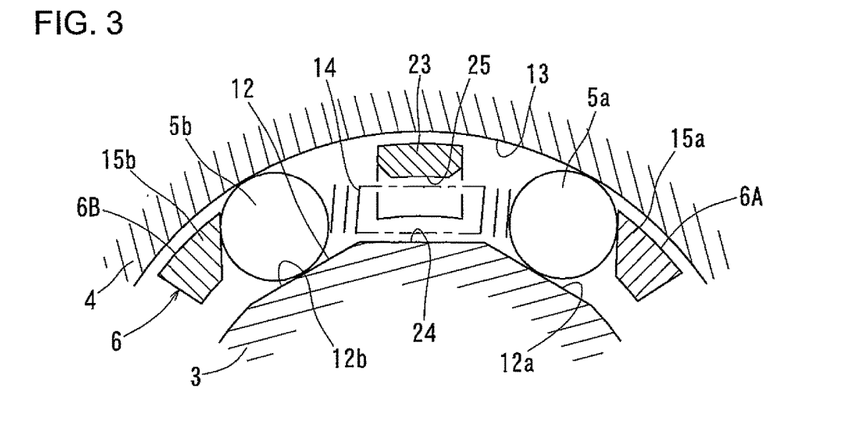
FIG. 3 is an enlarged view of and around a pair of rollers circumferentially opposed to each other with an elastic member of FIG. 2 therebetween.

As shown in FIGS. 2 and 3, a plurality of cam surfaces 12 are formed on the outer periphery of the inner ring 3 so as to be circumferentially equidistantly spaced apart from each other. Each cam surface 12 comprises a front cam surface portion 12a, and a rear cam surface portion 12b arranged rearward of the front cam surface portion 12a in the forward rotational direction of the inner ring 3. The inner periphery of the outer ring 4 is formed with a cylindrical surface 13 radially opposed to the cam surfaces 12.

A pair of rollers 5a and 5b are mounted between each cam surface 12 and the cylindrical surface 13 so as to be circumferentially opposed to each other with an elastic member 14 disposed therebetween. Of the pair of rollers 5a and 5b, the roller 5a is located forward of the roller 5b in the forward rotational direction, and disposed between the front cam surface portion 12a and the cylindrical surface 13, while the roller 5b, which is located rearward of the roller 5a, is disposed between the rear cam surface portion 12b and the cylindrical surface 13. An elastic member 14 is disposed between the pair of rollers 5a and 5b biases the rollers 5a and 5b in the directions in which the distance between the rollers 5a and 5b increases.

The front cam surface portion 12a is shaped and arranged such that the radial distance between the cam surface portion 12a and the cylindrical surface 13 gradually decreases in the forward rotational direction from the position where there is the roller 5a. The rear cam surface portion 12b is shaped and arranged such that the radial distance between the rear cam surface portion 12b and the cylindrical surface 13 gradually decreases in the direction opposite to the forward rotational direction from the position where there is the roller 5b. In FIG. 3, the front cam surface portion 12a and the rear cam surface portion 12b are separate flat surfaces that are inclined in opposite directions to each other. However, they instead may be formed on a single flat surface such that in the forward rotational direction, the front cam surface portion 12a is located at the front portion of the flat surface, and the rear cam surface portion 12b is located at the rear portion of the flat surface. While the front cam surface portion 12a and the rear cam surface portion 12b may also be in the shape of a curved surface, they are preferably flat surfaces as shown in FIG. 3 to reduce manufacturing costs.

As shown in FIGS. 1 to 3, the roller retainer 6 comprises a first split retainer portion 6A and a second split retainer portion 6B. Of the pairs of rollers 5a and 5b, of which each pair are circumferentially opposed to each other with the elastic member 14 disposed therebetween, the rollers 5a are supported by the first split retainer portion 6A, while the rollers 5b are supported by the second split retainer portion 6B. The first split retainer portion 6A and the second split retainer portion 6B are supported so as to be rotatable relative to each other, and support the rollers 5a and the rollers 5b, respectively, such that the distance between each pair of the rollers 5a and 5b changes when the retainer portions 6A and 6B rotate relative to each other.

The first split retainer portion 6A includes a plurality of pillars 15a arranged so as to be circumferentially spaced apart from each other, and an annular flange 16a coupling together ends of the pillars 15a. Similarly, the second split retainer portion 6B includes a plurality of pillars 15b arranged so as to be circumferentially spaced apart from each other, and an annular flange 16b coupling together ends of the pillars 15b.

The pillars 15a of the first split retainer portion 6A and the pillars 15b of the second split retainer portion 6B are inserted between the inner periphery of the outer ring 4 and the outer periphery of the inner ring 3 such that each pair of the rollers 5a and 5b that are circumferentially opposed to each with the elastic member 14 disposed therebetween are sandwiched between each pair of the pillars 15a and 15b.

As shown in FIG. 1, the flange 16a of the first split retainer portion 6A and the flange 16b of the second split retainer portion 6B are arranged so as to be axially opposed to each other with the flange 16b of the second split retainer portion 6B located axially closer to the inner ring 3 than is the flange 16a of the first split retainer portion 6A. The flange 16b of the second split retainer portion 6B is formed with a plurality of circumferentially spaced apart cutouts 17 for avoiding interference with the pillars 15a of the first split retainer portion 6A.

The flange 16a of the first split retainer portion 6A and the flange 16b of the second split retainer portion 6B are rotatably supported, at their respective inner peripheries, on a cylindrical surface 18 formed on the outer periphery of the input shaft 1 such that the first split retainer portion 6A and the second split retainer portion 6B are movable to an engaged position where the rollers 5a and 5b are engaged between the cylindrical surface 13 and the cam surfaces 12 by increasing the distances between the respective pairs of rollers 5a and 5b, and to a disengaged position where the rollers 5a and 5b are disengaged from the cylindrical surface 13 and the cam surfaces 12 by reducing the distances between the respective pairs of rollers 5a and 5b. The flange 16a of the first split retainer portion 6A is axially supported by an annular protrusion 20 provided on the outer periphery of the input shaft 1 through a thrust bearing 19 so as to be restricted in axial movement.

Figure 4:
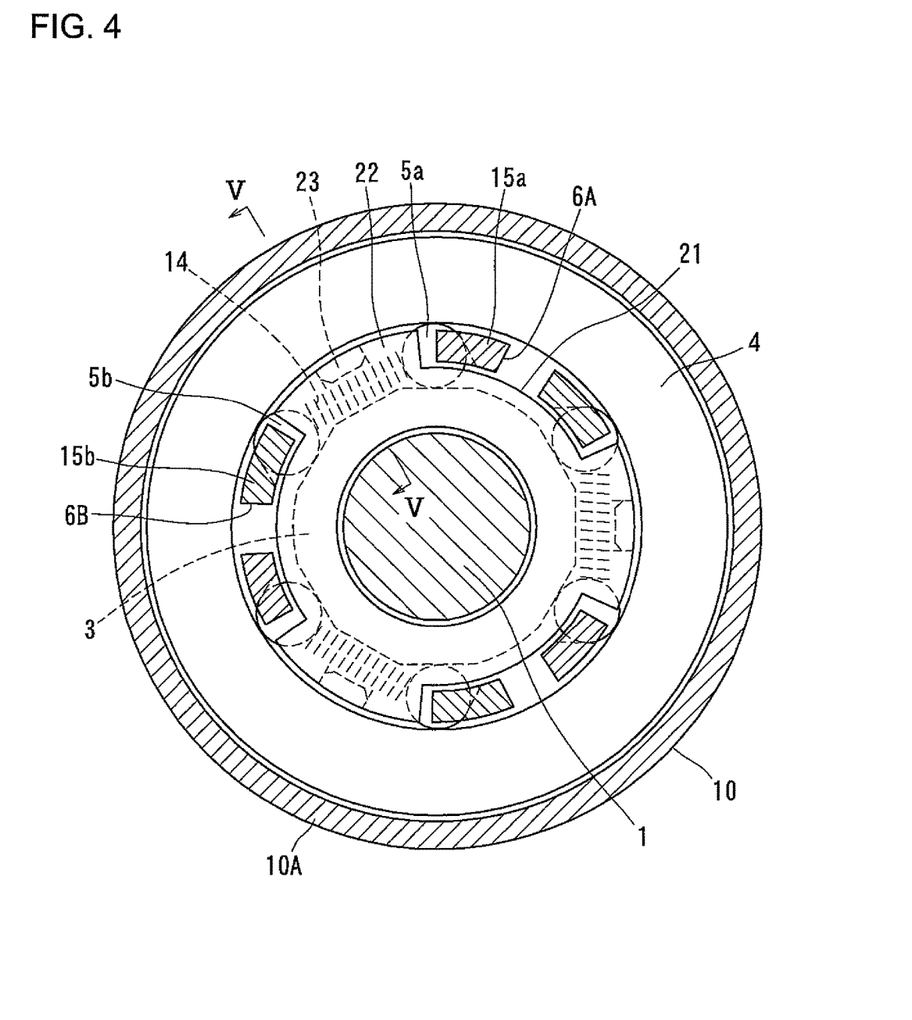
FIG. 4 is a sectional view taken along line IV-IV of FIG. 1.

As shown in FIG. 4, a spring holder 21 is fixed to a side surface of the inner ring 3. The spring holder 21 includes stopper pieces 22 each located between a pair of the pillars 15a and 15b that are circumferentially opposed to each other with the pair of rollers 5a and 5b disposed therebetween. The stopper pieces 22 are configured to receive and support, at their respective side edges, the pillars 15a and 15b when the pillars 15a and 15b move in the directions in which the distances between the respective pairs of rollers 5a and 5b decrease. The stopper pieces 22 thus prevent the elastic members 14 between the respective pairs of rollers 5a and 5b from being excessively compressed and broken, and also, keep constant the positions of the respective rollers 5a and 5b relative to the inner ring 3 when the distances between the respective pairs of rollers 5a and 5b decrease.

Figure 5:
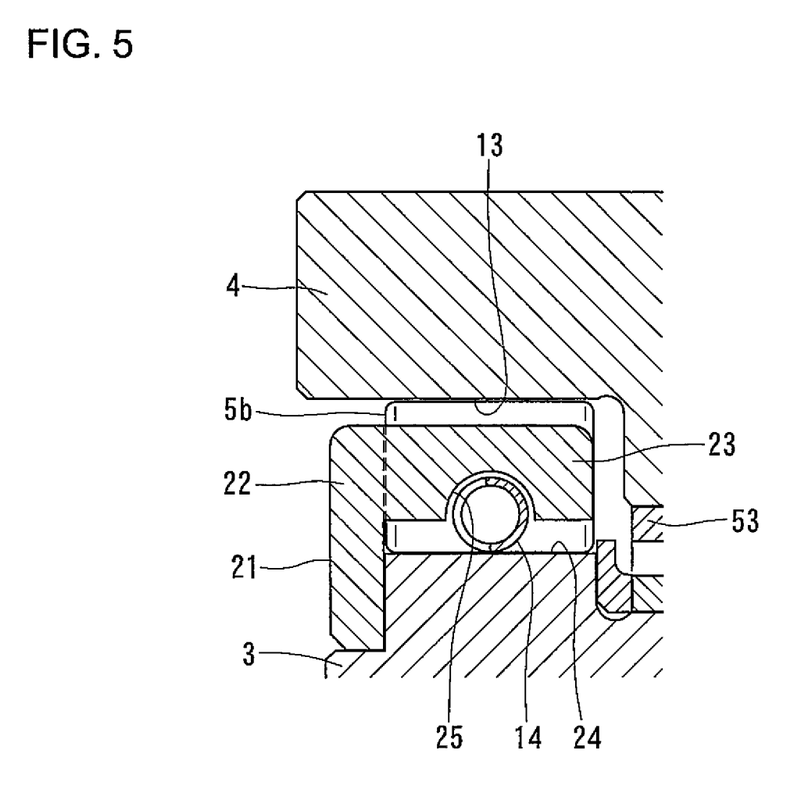
FIG. 5 is a sectional view taken along line V-V of FIG. 4.

As shown in FIG. 5, the spring holder 21 includes a spring retaining pieces 23 retaining the respective elastic members 14. The spring retaining pieces 23 are integral with the respective stopper pieces 22 to extend axially between the inner periphery of the outer ring 4 and the outer periphery of the inner ring 3. The spring retaining pieces 23 are radially opposed to respective spring support surfaces 24 (see FIG. 2) each defined between the front cam surface portion 12a and the rear cam surface portion 12b of each cam surface 12 on the outer periphery of the inner ring 3. Each spring retaining piece 23 has, in its surface opposed to the spring support surface 24, a recess 25 in which the elastic member 14 is received. The elastic members 14 are coil springs. The spring retaining pieces 23 restrict the movements of the elastic members 14 in the recesses 25 to prevent separation of the elastic members 14 from between the inner periphery of the outer ring 4 and the outer periphery of the inner ring 3.

As shown in FIG. 1, the rotation transmission device M according to the present invention includes, as a driving source for moving the roller retainer 6 (namely, the first split retainer portion 6A and the second split retainer portion 6B), an electromagnet 32 mounted on an end of the input shaft 1 of the housing 10. The rotation transmission device M includes an armature 30 made of a material capable of being attracted toward the electromagnet 32 when the electromagnet 32 is energized, a rotor 31 arranged between the electromagnet 32 and the armature 30, and a ball-ramp mechanism 33 configured to convert the motion of the armature 30 when attracted to the rotor 31 to the relative motion between the first split retainer portion 6A and the second split retainer portion 6B from the engaged position to the disengaged position.

The armature 30 includes an annular disk portion 34 and a cylindrical portion 35 integral with, and extending axially from, the outer periphery of the disk portion 34. The second split retainer portion 6B includes a cylindrical portion 36 integral with, and extending axially from, the outer periphery of the flange 16b. The cylindrical portion 36 is press-fitted in the cylindrical portion 35 of the armature 30, so that the armature 30 is coupled to the second split retainer portion 6B so as to move axially in unison with the second split retainer portion 6B. The armature 30 is rotatably and axially movably supported by a cylindrical surface 37 on the outer periphery of the input shaft 1. Since the armature 30 is supported at two axially spaced apart locations (namely, at the inner periphery of the armature 30 and the inner periphery of the second split retainer portion 6B), the armature 30 is prevented from tilting relative to the direction perpendicular to the axial direction.

The rotor 31 is fitted on the outer periphery of the input shaft 1 with an interference fit, so that the rotor 31 is supported on the outer periphery of the input shaft 1 so as to be movable neither in the axial nor circumferential directions. The rotor 31 and the armature 30 are each made of a ferromagnetic metal. In its surface opposed to the armature 30, the rotor 31 has a plurality of circumferentially elongated holes 38 extending axially through the rotor 31 and circumferentially spaced apart from each other.

The electromagnet 32 includes a solenoid coil 39, and a field core 40 around which the solenoid coil 39 is wound. The field core 40 is inserted in the end portion of the housing 10 on the side of the input shaft 1, and is prevented from being pulled out of the housing 10 by a snap ring 41. The electromagnet 32 is configured to form a magnetic path that passes through the field core 40, the rotor 31 and the armature 30 when the solenoid coil 39 is energized, thereby attracting the armature 30 to the rotor 31 so that surface of the armature 30 opposed to the rotor 31 is brought into surface contact with the surface of the rotor 31 opposed to the armature 30.

Figure 6:
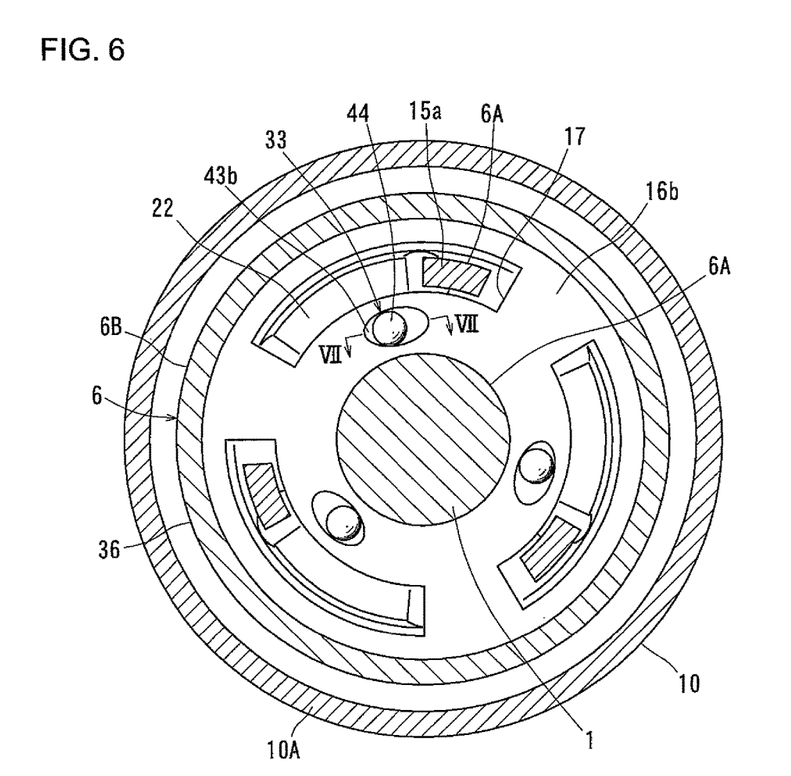
FIG. 6 is a sectional view taken along VI-VI of FIG. 1.
Figure 7A:
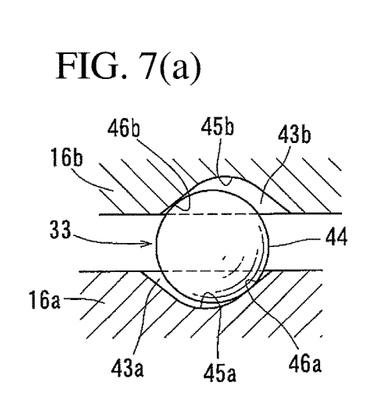
FIG. 7(a) is a sectional view taken along line VII-VII of FIG. 6.
Figure 7B:
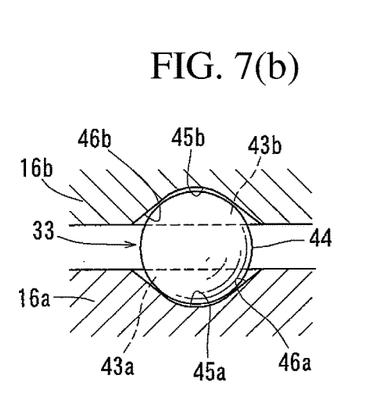
FIG. 7(b) is a sectional view similar to FIG. 7(a) and showing how a ball shown in FIG. 7(a) rolls to the deepest points of respective inclined grooves, thereby rotating a first split retainer portion and a second split retainer portion relative to each other.

As shown in FIGS. 6, 7(a) and 7(b), the ball-ramp mechanism 33 comprises inclined grooves 43a formed in the surface of the flange 16a of the first split retainer portion 6A opposed to the flange 16b of the second split retainer portion 6B; inclined grooves 43b formed in the surface of the flange 16b of the second split retainer portion 6B opposed to the flange 16a of the first split retainer portion 6A; and balls 44 each disposed between a pair of the inclined grooves 43a and 43b. The inclined grooves 43a and 43b extend in the circumferential direction. Each inclined groove 43a has a groove bottom 46a inclined so that the depth of the inclined groove 43a decreases gradually in one of the opposite circumferential directions from a deepest point 45a where the inclined groove 43a is the deepest in the axial direction. Each inclined groove 43b has a groove bottom 46b inclined so that the depth of the inclined groove 43b decreases gradually in the other circumferential direction from a deepest point 45b where the inclined groove 43b is the deepest in the axial direction. Each ball 44 is sandwiched between the groove bottoms 46a and 46b.

The ball-ramp mechanism 33 is configured such that when the flange 16b of the second split retainer portion 6B moves axially toward the flange 16a of the first split retainer portion 6A, each ball 44 rolls toward the deepest points 45a and 45b of the inclined grooves 43a and 43b (see FIG. 7(b)), thus causing the first split retainer portion 6A and the second split retainer portion 6B to rotate relative to each other in the direction in which the pillars 15a of the first split retainer portion 6A and the pillars 15b of the second split retainer portion 6B move to reduce the distances between the respective pairs of rollers 5a and 5b.

The armature 30 is biased in the direction away from the rotor 31 under the forces of the elastic members 14. In particular, the forces with which the elastic members 14, shown in FIG. 2, press the respective pairs of rollers 5a and 5b in the directions in which the distances between the respective pairs of rollers 5a and 5b increase are transmitted to the first split retainer portion 6A and the second split retainer portion 6B, as circumferential forces. The circumferential forces received by the first split retainer portion 6A and the second split retainer portion 6B are converted to an axial force in the direction away from the rotor 31, and transmitted to the second split retainer portion 6B, by the ball-ramp mechanism 33 shown in FIGS. 6, 7(a) and 7(b). As a result, since, as shown in FIG. 1, the armature 30 is fixed to the second split retainer portion 6B, the armature 30 is continuously biased in the direction away from the rotor 31 under the forces transmitted from the elastic members 14 through the ball-ramp mechanism 33.

The housing 10 comprises a cylindrical straight portion 10A in which are received the electromagnet 32, the rotor 31, the armature 30 and the outer ring 4, and a decreasing-diameter portion 10B of which the inner diameter gradually decreases from its end on the side of the input shaft 1 toward its end on the side of the output shaft 2. The electromagnet 32 is mounted in the end portion of the straight portion 10A on the side of the input shaft 1. The straight portion 10A has no flange on its outer periphery through which the straight portion 10A is to be fixed to an external member.

A first bearing 51 is mounted between the field core 40 of the electromagnet 32 and the input shaft 1. The first bearing 51 may be, for example, a deep groove ball bearing. A second bearing 52 is mounted between the end portion of the housing 10 on the side of the output shaft 2 and the output shaft 2. The second bearing 52 is fitted in an inner periphery of the decreasing-diameter portion 10B of the housing 10. The inner periphery of the decreasing-diameter portion 10B of the housing 10 has a diameter smaller than the inner periphery of the outer ring 4. The second bearing 52 may be, for example, a deep groove ball bearing. A third bearing 53 is mounted between the inner ring 3 and the outer ring 4. The third bearing 53 may be, for example, a deep groove ball bearing. A fourth bearing 54 is also mounted between the inner ring 3 and the outer ring 4, in juxtaposition with the third bearing 53. The fourth bearing 54 may be, for example, a deep groove ball bearing. The third bearing 53 and the fourth bearing 54 support each of the inner ring 3 and the outer ring 4 at two respective axially spaced apart locations.

Now the operation of this rotation transmission device M is described.

As shown in FIG. 1, while the electromagnet 32 is not energized, the rotation transmission device M is in the engaged state in which rotation is transmitted between the inner ring 3 and the outer ring 4. In particular, while the electromagnet 32 is not energized, the armature 30 is kept away from the rotor 31 under the forces of the elastic members 14. Also in this state, under the forces of the elastic members 14, which tend to push the respective pairs of rollers 5a and 5b in the directions in which the distances between the respective pairs of rollers 5a and 5b increase, the rotationally forward rollers 5a are engaged between the cylindrical surface 13 on the inner periphery of the outer ring 4 and the respective rotationally forward cam surface portions 12a on the outer periphery of the inner ring 3, while the rotationally rearward rollers 5b are engaged between the cylindrical surface 13 on the inner periphery of the outer ring 4 and the respective rotationally rearward cam surface portions 12b on the outer periphery of the inner ring 3. When, in this state, the inner ring 3 rotates in the forward rotational direction, the rotation of the inner ring 3 is transmitted from the inner ring 3 to the outer ring 4 through the rotationally rearward rollers 5b. When the inner ring 3 rotates in the reverse direction, its rotation is transmitted from the inner ring 3 to the outer ring 4 through the rotationally forward rollers 5a.

While the electromagnet 32 is energized, the rotation transmission device M is in the disengaged state in which no rotation is transmitted between the inner ring 3 and the outer ring 4 (with each ring rotatable independently of the other). In particular, when the electromagnet 32 is energized, the armature 30 is attracted to the rotor 31, and in association with this movement of the armature 30, the flange 16b of the second split retainer portion 6B moves axially toward the flange 16a of the first split retainer portion 6A. At that time, the balls 44 of the ball-ramp mechanism 33 roll along the respective inclined grooves 43a, 43b toward the deepest points 45a, 45b, thus causing the first split retainer portion 6A and the second split retainer portion 6B to rotate relative to each other. The relative rotation between the first split retainer portion 6A and the second split retainer portion 6B in turn causes the pillars 15a of the first split retainer portion 6A and the pillars 15b of the second split retainer portion 6B to press the respective pairs of rollers 5a and 5b in the directions in which the distances between the respective pairs of rollers 5a and 5b decrease. As a result, the rotationally forward rollers 5a move out of an engagement standby position (i.e., a position where there is a minute gap between each rotationally forward roller 5a and the cylindrical surface 13, but the rollers 5a can instantly engage between the cylindrical surface 13 and the respective rotationally forward cam surface portions 12a when the inner ring 3 rotates in the reverse rotational direction), while the rotationally rearward rollers 5b move out of an engagement standby position (i.e., a position where there is a minute gap between each rotationally rearward roller 5b and the cylindrical surface 13, but the rollers 5b can instantly engage between the cylindrical surface 13 and the respective rotationally rearward cam surface portions 12b when the inner ring 3 rotates in the forward rotational direction). When the inner ring 3 is rotated in this state, the rotation of the inner ring 3 is not transmitted to the outer ring 4, and the inner ring 3 rotates alone.

Figure 8:
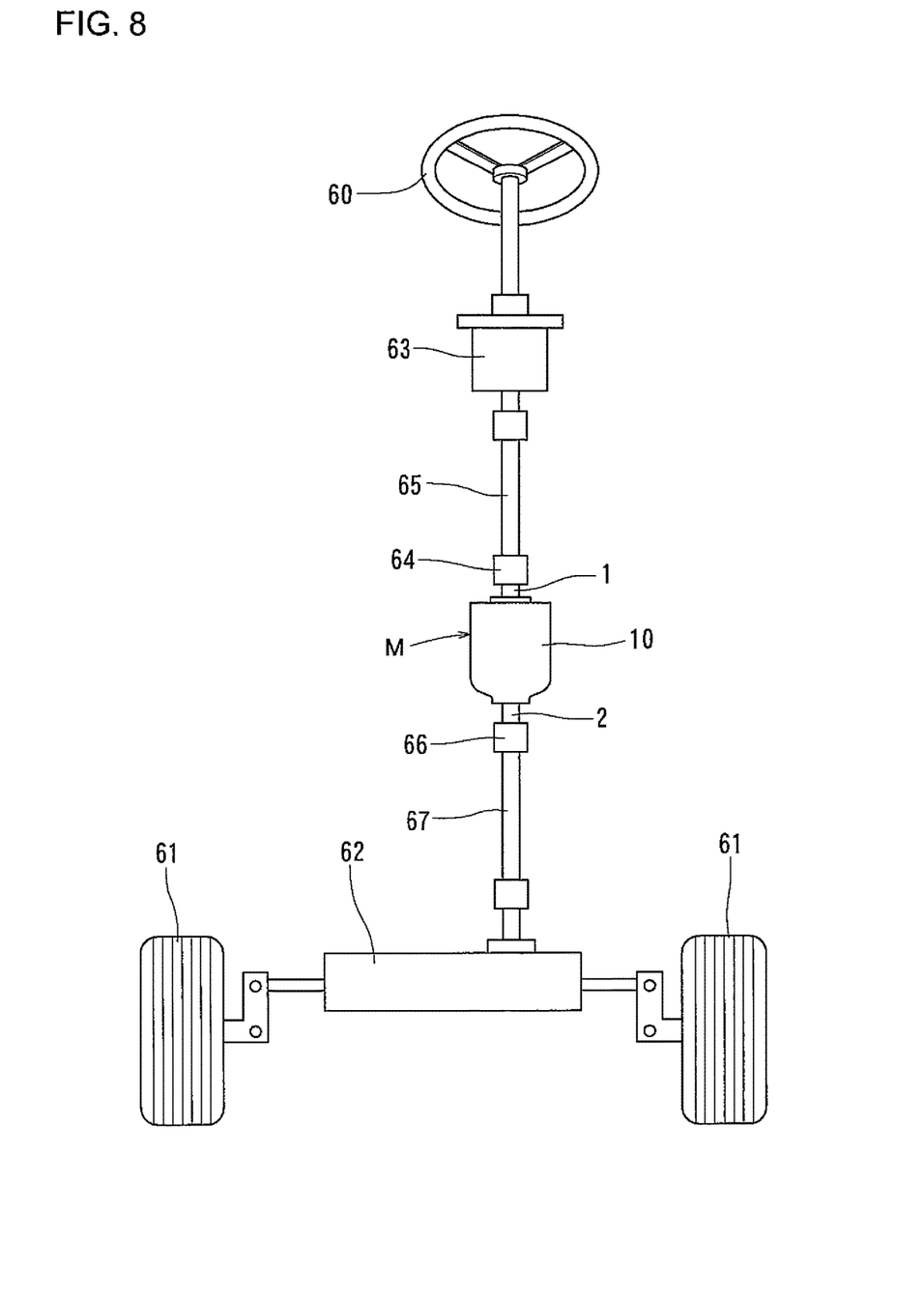
FIG. 8 is a schematic view of a steer-by-wire type vehicle steering assembly in which is used the rotation transmission device shown in FIG. 1.

This rotation transmission device M is used e.g., in a steer-by-wire type vehicle steering assembly as shown in FIG. 8. The steer-by-wire type vehicle steering assembly is configured to convert the steering angle of a steering wheel 60 when the steering wheel 60 is operated by a driver to an electrical signal, and steer right and left wheels 61 based on the electrical signal. The rotation transmission device M is mounted at an intermediate portion of the rotation transmission path of this steer-by-wire type vehicle steering assembly between the steering wheel 60 and a steering actuator 62 which changes the steering angle of the right and left wheels 61. The rotation transmission device M has a function as a backup clutch which, during the normal state, prohibits transmission of rotation between the steering wheel 60 and the steering actuator 62, and which, in an abnormal state, such as if power is lost, allows transmission of rotation between the steering wheel 60 and the steering actuator 62. A reaction force actuator 63 is connected to the steering wheel 60 to apply a reaction force to the steering wheel 60 according to the behavior of the vehicle.

The rotation transmission device M has its input shaft 1 connected to a shaft 65 on the side of the steering wheel 60 through a shaft coupling 64, and its output shaft 2 connected to a shaft 67 on the side of the steering actuator 62 through a shaft coupling 66, and is supported by the shaft 65, which is connected to the input shaft 1 on the side of the steering wheel 60, and by the shaft 67, which is connected to the output shaft 2 on the side of the steering actuator 62. Unlike the conventional arrangement, the housing 10 is not fixed to a portion of the vehicle body (such as a partition wall between the dashboard and the engine room), but is kept afloat in the air.

However, as shown in FIG. 1, the input shaft 1 and the output shaft 2 are supported at three locations by the first bearing 51 mounted between the electromagnet 32 and the input shaft 1, the second bearing 52 mounted between the end portion of the housing 10 on the side of the output shaft 2 and the output shaft 2, and the third bearing 53 mounted between the inner ring 3 and the outer ring 4, and additionally supported at a fourth location by the fourth bearing 54. Therefore, any load that is applied between the input shaft 1 and the output shaft 2 which tends to cause the axes of the input shaft 1 and the output shaft 2 to be inclined relative to each other will be less likely to cause such inclination (misalignment) of the axes of the input shaft 1 and the output shaft 2. Thus, any change in relative position between the inner ring 3, provided on the input shaft 1, and the outer ring 4, provided on the output shaft 2 is minimized. As a result, the behavior of the rollers 5a and 5b, mounted between the inner ring 3 and the outer ring 4, stabilizes.

With the rotation transmission device M of this embodiment, since the fourth bearing 54 prevents inclination of the axes of the input shaft 1 and the output shaft 2, the relative position between the inner ring 3, provided on the input shaft 1, and the outer ring 4, provided on the output shaft 2, is less likely to change, so that the behavior of the rollers 5a and 5b, mounted between the inner ring 3 and the outer ring 4, is stable. This makes it unnecessary to fix the housing 10 in position by means of a flange, which was necessary in the conventional arrangement.

Figure 9:
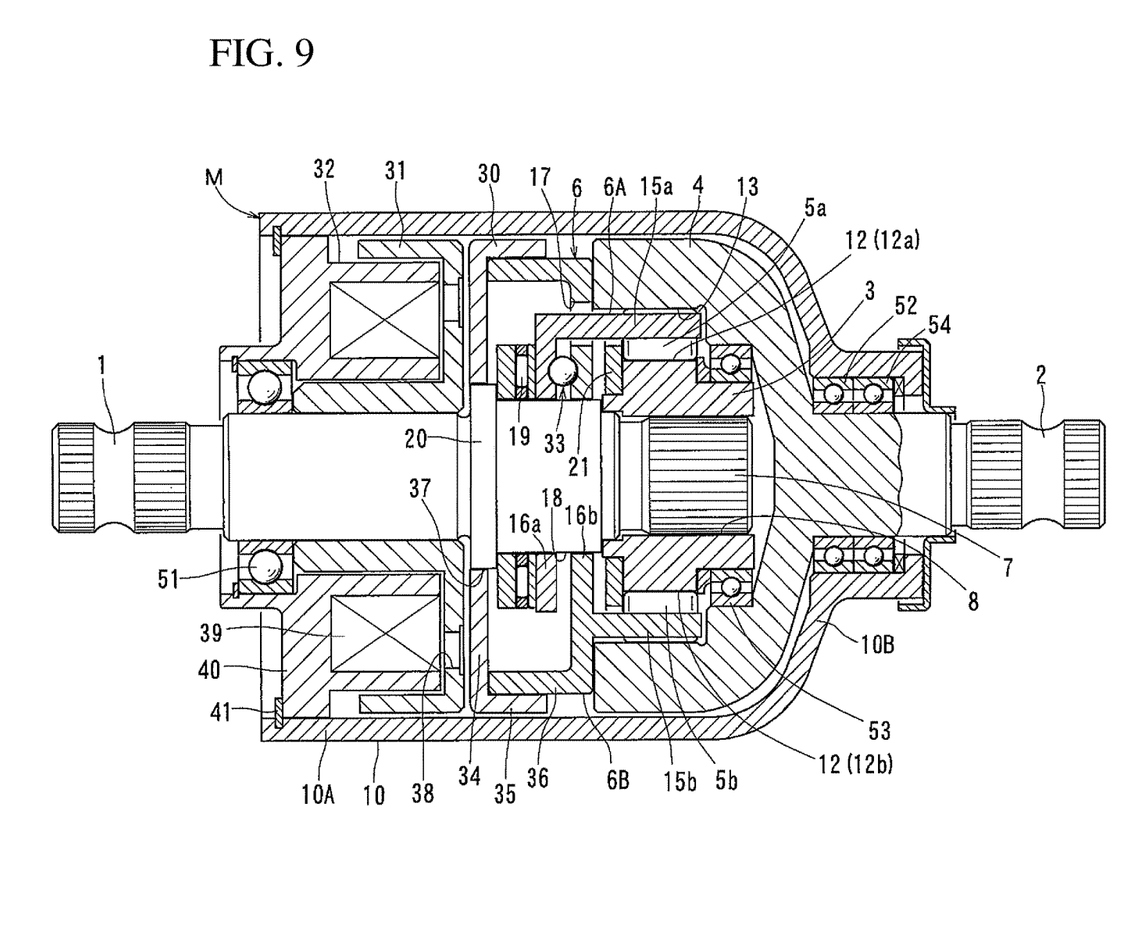
FIG. 9 is a sectional view of a modified example of the rotation transmission device shown in FIG. 1.

FIG. 9 shows a different embodiment according to the present invention. Here, elements corresponding to the first embodiment are denoted by identical numerals, and their description is omitted. In this embodiment, the fourth bearing 54 is mounted between the end portion of the housing 10 on the side of the output shaft 2 and the output shaft 2, in juxtaposition with the second bearing 52. The fourth bearing 54 of this embodiment is, for example, a deep groove ball bearing. The second bearing 52 and the fourth bearing 54 support each of the housing 10 and the output shaft 2 at two respective axially spaced apart locations. This prevents inclination of the axes of the housing 10 and the output shaft 2 relative to each other, so that even when a load is applied that tends to cause the axes of the input shaft 1 and the output shaft 2 to be inclined relative to each other, the behavior of the engaging elements mounted between the inner ring 3 and the outer ring 4, is kept stable.

Figure 10:
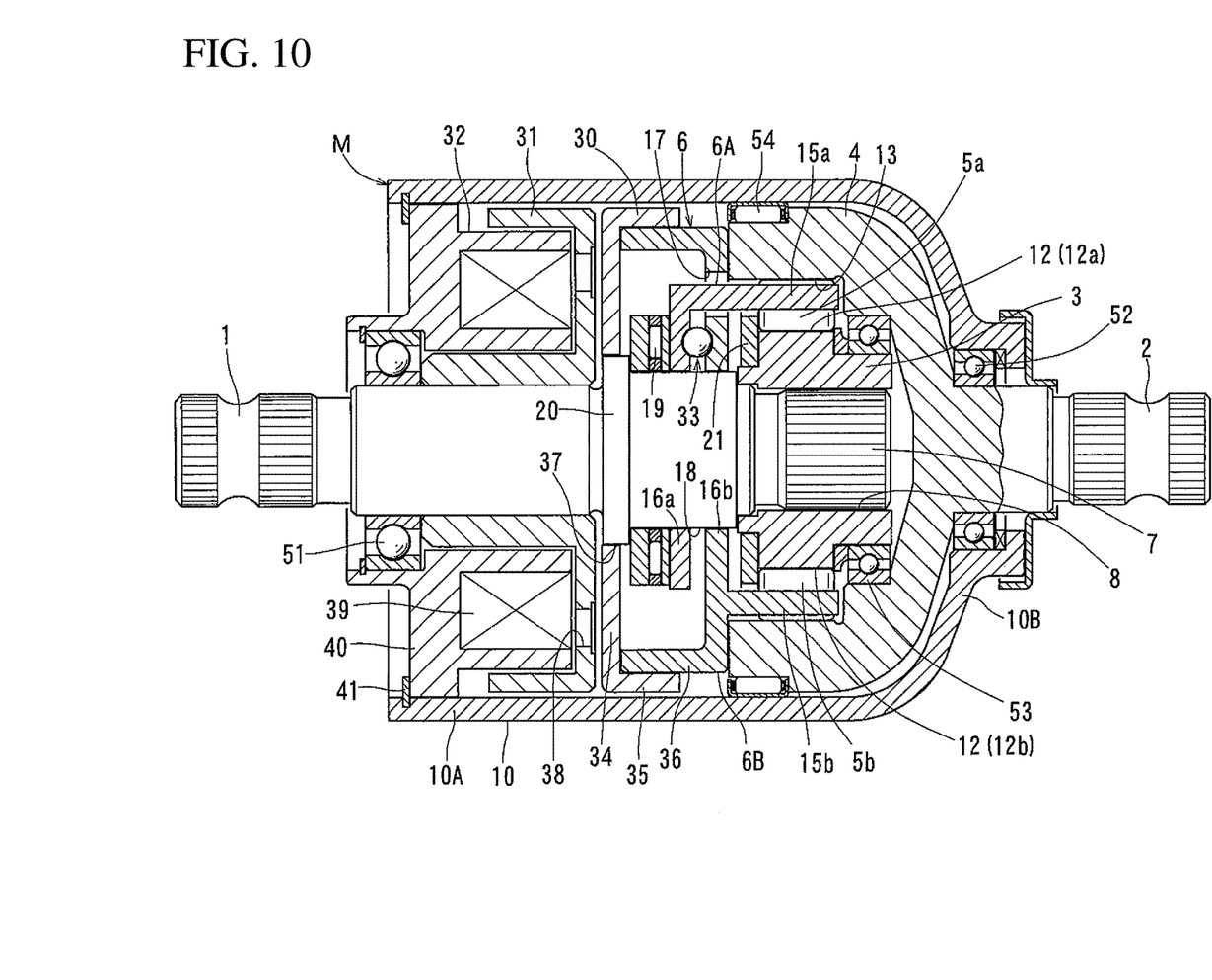
FIG. 10 is a sectional view of another modified example of the rotation transmission device shown in FIG. 1.

FIG. 10 shows a still different embodiment of the present invention, in which the fourth bearing 54 is mounted between the inner periphery of the housing 10 and the outer periphery of the end portion of the outer ring 4 on the side of the input shaft 1. The fourth bearing 54 of this embodiment may be, for example, a needle roller bearing. The second bearing 52 and the fourth bearing 54 support, respectively, the output shaft 2 and the outer ring 4 at two respective axially spaced apart locations. This prevents inclination of the axes of the housing 10 and the output shaft 2 relative to each other, so that even when a load is applied that tends to cause the axes of the input shaft 1 and the output shaft 2 to be inclined relative to each other, the behavior of the engaging elements mounted between the inner ring 3 and the outer ring 4, is kept stable.

Figure 11:
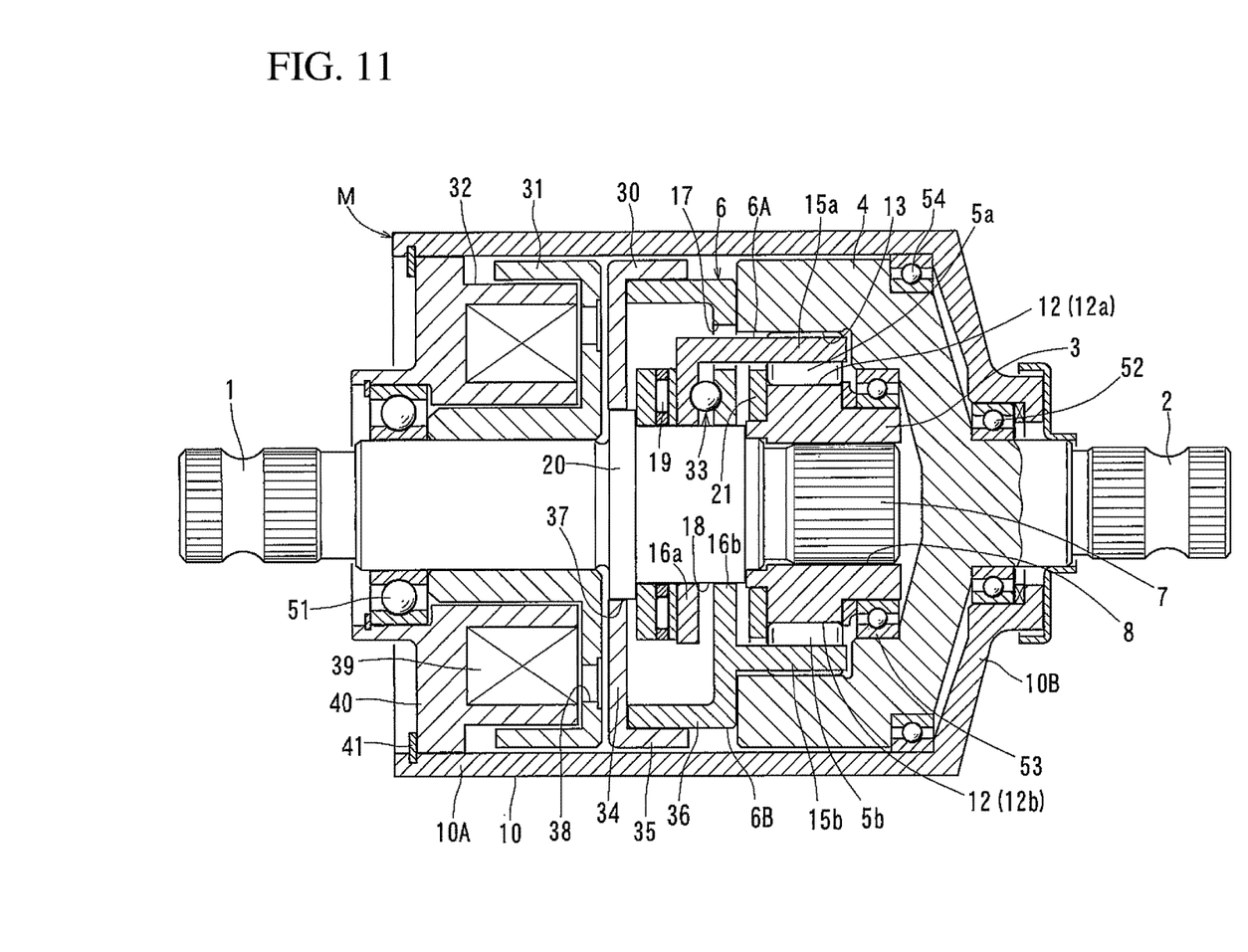
FIG. 11 is a sectional view of still another modified example of the rotation transmission device shown in FIG. 1.

FIG. 11 shows a further different embodiment of the present invention, in which the fourth bearing 54 is mounted between the inner periphery of the housing 10 and the outer periphery of the end portion of the outer ring 4 on the side of the output shaft 2. The fourth bearing 54 of this embodiment may be, for example, a deep groove ball bearing. The second bearing 52 and the fourth bearing 54 support, respectively, the output shaft 2 and the outer ring 4 at two respective axially spaced apart locations. This prevents inclination of the axes of the housing 10 and the output shaft 2 relative to each other, so that even when a load is applied that tends to cause the axes of the input shaft 1 and the output shaft 2 to be inclined relative to each other, the behavior of the engaging elements mounted between the inner ring 3 and the outer ring 4, is kept stable.

In any of the above-described embodiments, as engaging elements, the rollers 5a and 5b are mounted between the inner periphery of the outer ring 4 and the outer periphery of the inner ring 3, but the present invention is applicable to a rotation transmission device M in which balls or sprags are used as the engaging elements.

It is to be understood that the embodiments disclosed above are not intended to restrict the scope of the invention. Rather, it is to be understood that the accompanying claims define the scope of the present invention, and the present invention encompasses any modification and alteration of the embodiment that is within the scope of the accompanying claims.

DESCRIPTION OF THE NUMERALS

1. Input shaft
2. Output shaft
3. Inner ring
4. Outer ring
5a, 5b. Roller
6. Roller retainer
10. Housing
32. Electromagnet
51. First bearing
52. Second bearing
53. Third bearing
54. Fourth bearing
M. Rotation transmission device

What is claimed is:

1. A rotation transmission device comprising:
a tubular housing having two open ends;
an input shaft having one end thereof received in the housing;
an output shaft arranged coaxially with the input shaft, and having one end of the output shaft received in the housing;
an inner ring provided at a portion of the input shaft received in the housing;
an outer ring provided at a portion of the output shaft received in the housing, the outer ring surrounding the inner ring;
engaging elements mounted between an inner periphery of the outer ring and an outer periphery of the inner ring;
an engaging element retainer supported so as to be movable between an engaged position where the engaging elements are engaged between the outer ring and the inner ring by the engaging element retainer, and a disengaged position where the engaging elements are disengaged from the outer ring and the inner ring by the engaging element retainer;
a driving source for moving the engaging element retainer, the driving source comprising an electromagnet mounted at an end portion of the housing on a side of the input shaft;
a first bearing mounted between the electromagnet and the input shaft;
a second bearing mounted between an end portion of the housing on a side of the output shaft and the output shaft;
a third bearing mounted between the inner ring and the outer ring; and
a fourth bearing arranged in such a manner as to prevent inclination of axes of the input shaft and the output shaft relative to each other, the fourth bearing being mounted between an inner periphery of the housing and an outer periphery of an end portion of the outer ring located closest to the input shaft;
wherein the housing is supported by a first shaft connected to the input shaft and by a second shaft connected to the output shaft, without being fixed to any portion of a vehicle body.

2. The rotation transmission device of claim 1, wherein the housing is supported by only the first shaft connected to the input shaft and the second shaft connected to the output shaft.

* * * * *